US010783212B2

(12) United States Patent
Wang

(10) Patent No.: US 10,783,212 B2
(45) Date of Patent: Sep. 22, 2020

(54) METHOD AND APPARATUS FOR REALIZING COMMUNICATION BETWEEN WEB PAGE AND NATIVE APPLICATION, AND ELECTRONIC DEVICE

(71) Applicant: ALIBABA GROUP HOLDING LIMITED, Grand Cayman (KY)

(72) Inventor: Wei Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 13 days.

(21) Appl. No.: 16/356,506

(22) Filed: Mar. 18, 2019

(65) Prior Publication Data
US 2019/0213231 A1 Jul. 11, 2019

Related U.S. Application Data

(63) Continuation of application No. PCT/CN2017/101277, filed on Sep. 11, 2017.

(30) Foreign Application Priority Data

Sep. 19, 2016 (CN) .......................... 2016 1 0832369

(51) Int. Cl.
G06F 15/16 (2006.01)
G06F 16/957 (2019.01)
(Continued)

(52) U.S. Cl.
CPC .......... *G06F 16/9574* (2019.01); *G06F 9/547* (2013.01); *G06F 16/9566* (2019.01); *H04L 67/32* (2013.01); *H04L 69/161* (2013.01)

(58) Field of Classification Search
USPC ....................................................... 709/231
See application file for complete search history.

(56) References Cited

U.S. PATENT DOCUMENTS 5,928,330 A * 7/1999 Goetz .................. H04N 19/587
348/E5.008
6,119,166 A 9/2000 Bergman et al.
(Continued)

FOREIGN PATENT DOCUMENTS

CN 1716251 B 4/2010
CN 102625290 A 8/2012
(Continued)

OTHER PUBLICATIONS

Taiwanese Search Report for Taiwan Patent Application No. 10821187990 dated Dec. 13, 2019 (1 page).
(Continued)

*Primary Examiner* — Anthony Mejia
(74) *Attorney, Agent, or Firm* — Sheppard Mullin Richter & Hampton LLP

(57) ABSTRACT

A method for communication of a native application on a terminal includes: receiving a first response from a web server in response to a web page access request initiated via the apparatus, wherein the first response comprises an identifier and version information of an application; selecting a port and initiating, to a local server on the apparatus, an access request carrying an identification of the selected port; determining whether a second response carrying an identifier and version information of a native application bound with the selected port on the terminal is received from the local server; in response to determining that the second response is received, determining whether the identifier of the native application and the identifier of the application in the first response are the same; and in response to determining that the identifiers are the same, adjusting an operation prompt according to the version information of the native application and the version information of the application in the first response.

20 Claims, 5 Drawing Sheets

(51) Int. Cl.
*G06F 9/54* (2006.01)
*G06F 16/955* (2019.01)
*H04L 29/08* (2006.01)
*H04L 29/06* (2006.01)

(56) References Cited

U.S. PATENT DOCUMENTS

| | | | |
|---|---|---|---|
| 6,182,146 B1* | 1/2001 | Graham-Cumming, Jr. | H04L 29/12009 370/389 |
| 6,546,554 B1 | 4/2003 | Schmidt et al. | |
| 6,571,392 B1 | 5/2003 | Zigmond et al. | |
| 7,275,096 B2 | 9/2007 | Green | |
| 7,406,664 B1 | 7/2008 | Morton et al. | |
| 7,849,437 B2 | 12/2010 | Isaacs et al. | |
| 8,176,120 B2 | 5/2012 | Rosenstein et al. | |
| 8,255,494 B1 | 8/2012 | Boodman et al. | |
| 8,346,223 B1* | 1/2013 | Byrnes | G06F 8/61 455/414.1 |
| 8,407,290 B2 | 3/2013 | Abt, Jr. et al. | |
| 8,898,766 B2 | 11/2014 | Garmark et al. | |
| 8,938,726 B2 | 1/2015 | Barak | |
| 9,002,821 B2 | 4/2015 | Chang et al. | |
| 9,053,201 B2 | 6/2015 | D'aurelio et al. | |
| 9,390,172 B2 | 7/2016 | Schleifer et al. | |
| 9,465,596 B2 | 10/2016 | Kay et al. | |
| 9,935,944 B2 | 4/2018 | Garmark et al. | |
| 10,564,988 B1* | 2/2020 | Jose | H04L 67/28 |
| 2004/0210663 A1* | 10/2004 | Phillips | H04L 67/1014 709/230 |
| 2005/0044483 A1 | 2/2005 | Maze et al. | |
| 2006/0004764 A1 | 1/2006 | Kurhekar et al. | |
| 2013/0111328 A1 | 5/2013 | Khanna et al. | |
| 2013/0139103 A1* | 5/2013 | Laborczfalvi | G06F 3/0481 715/794 |
| 2014/0053062 A1 | 2/2014 | Cahill et al. | |
| 2014/0067835 A1 | 3/2014 | Harrison et al. | |
| 2014/0237351 A1 | 8/2014 | Seidl et al. | |
| 2014/0280694 A1 | 9/2014 | Bilange | |
| 2016/0134737 A1 | 5/2016 | Pulletikurty | |
| 2016/0239469 A1 | 8/2016 | Hamon | |
| 2016/0344845 A1* | 11/2016 | Shuman | H04L 67/42 |
| 2017/0359213 A1* | 12/2017 | Li | G06F 8/60 |
| 2019/0213231 A1* | 7/2019 | Wang | G06F 16/958 |

FOREIGN PATENT DOCUMENTS

| | | |
|---|---|---|
| CN | 102316160 B | 9/2013 |
| CN | 103279375 A | 9/2013 |
| CN | 103514089 A | 1/2014 |
| CN | 103731445 A | 4/2014 |
| CN | 103890756 A | 6/2014 |
| CN | 104394237 A | 3/2015 |
| CN | 104598268 A | 5/2015 |
| CN | 105159692 A | 12/2015 |
| CN | 105939355 A | 9/2016 |
| CN | 107015870 A | 8/2017 |
| EP | 1489505 A2 | 12/2004 |
| EP | 1499089 B1 | 4/2014 |
| JP | 2013-196122 A | 9/2013 |
| JP | 2016-517571 A | 6/2016 |
| JP | 6219296 B2 | 10/2017 |
| KR | 20130094761 A | 8/2013 |
| WO | 2016/095686 A1 | 6/2016 |

OTHER PUBLICATIONS

Chinese First Search Report for Chinese Patent Application No. 201610832369.8 dated Jan. 20, 2020 (1 page).
Chinese First Office Action for Chinese Patent Application No. 201610832369.8 dated Feb. 3, 2020 (13 pages).
Office Action for Korean Application No. 10-2019-7011095 dated Apr. 2, 2020.
Search Report for European Application No. 17850242.3 dated Mar. 9, 2020.
Second Office Action for Chinese Application No. 201610832369.8 dated May 18, 2020.
International Preliminary Report on Patentability Chapter I for PCT Application No. PCT/CN2017/101277 dated Mar. 28, 2019 (11 pages).
Written Opinion of the International Searching Authority and International Search Report for PCT Application No. PCT/CN2017/101277 dated Dec. 22, 2017 (14 pages).
Office Action for Japanese Application No. 2019-515258 dated Jun. 2, 2020.

* cited by examiner

METHOD AND APPARATUS FOR REALIZING COMMUNICATION BETWEEN WEB PAGE AND NATIVE APPLICATION, AND ELECTRONIC DEVICE

CROSS-REFERENCE TO RELATED APPLICATIONS

This application is a continuation application of International Patent Application No. PCT/CN2017/101277, filed on Sep. 11, 2017, which is based on and claims priority to the Chinese Patent Application No. 201610832369.8, filed on Sep. 19, 2016 and entitled "METHOD AND APPARATUS FOR REALIZING COMMUNICATION BETWEEN WEB PAGE AND NATIVE APPLICATION, AND ELECTRONIC DEVICE." The above-referenced applications are incorporated herein by reference in their entirety.

TECHNICAL FIELD

This application relates to the field of communications technologies, and in particular, to a method, an apparatus, and an electronic device for realizing communication between a web page and a native application ("native app").

BACKGROUND

A newly developed application ("app") usually needs to be promoted online. The promotion is usually carried out in the following manner: deploying a promotion picture (such as a banner picture or a two-dimensional code) on a web page, and then directly adding a link with a download prompt (a type of operation prompt) to the promotion picture. When a user clicks the banner or scans the two-dimensional code, the link with the download prompt pops up. Such a download prompt obviously brings poor experience to users who have already installed the application. Because it is generally impossible to realize communication between a web page and a native application at present, a browser normally cannot adjust an operation prompt on the web page according to an actual application installation status of a user terminal to improve user experience. For example, if a version of the application on the web page requested by the user terminal is already installed on the user terminal, the operation prompt of the application on the web page can be adjusted from "download" to "installed" and then presented to the user.

With the advance of technologies, a browser can realize indirect communication between a web page and a native application in some cases. For example, the browser can first attempt to invoke a native application by means of a uniform resource locator schema ("url schema"), and add a user identifier ("uid") to the url schema. After receiving the url schema, the native application sends, to a server, the uid and information that needs to be transmitted to the browser. The server stores the uid and the information. The browser initiates polling to the server according to the uid. The server obtains the information through matching with the uid, and then transmits the information to the browser while deleting the information of the uid.

However, the foregoing indirect communication manner requires the native application to be registered to the url schema and the browser to support the url schema as well; otherwise, the native application cannot be invoked. In addition, the process that the native application sends, to the server, the uid and the information which needs to be transmitted to the web page and the process that the web page obtains the uid from the server both need support of a network. If the network is abnormal or in a poor condition, the transmission of the uid will fail, resulting in an interruption of the whole process; besides, such an interruption cannot be learned by any of the web page, the native application and the server, and therefore user experience is also affected.

SUMMARY

The embodiments of this application provide a method, an apparatus and an electronic device for realizing communication between a web page and a native application so as to improve user experience.

According to one aspect, the embodiments of this application provide a communication method for a native application on a terminal, where the terminal has a local server which provides a uniform resource locator (url) service to the native application via a port bound with the native application, and the method includes the following steps: receiving a first response from a web server in response to a web page access request initiated via the apparatus, wherein the first response comprises an identifier and version information of an application; selecting a port and initiating, to a local server on the apparatus, an access request carrying an identification of the selected port; determining whether a second response carrying an identifier and version information of a native application bound with the selected port on the terminal is received from the local server; in response to determining that the second response is received, determining whether the identifier of the native application and the identifier of the application in the first response are the same; and in response to determining that the identifiers are the same, adjusting an operation prompt according to the version information of the native application and the version information of the application in the first response.

In some embodiments, the adjusting an operation prompt according to the version information of the native application and the version information of the application in the first response comprises: in response to determining that a version of the native application is lower than a version of the application in the first response, adjusting the operation prompt to be an indication to update the native application; or in response to determining that a version of the native application is not lower than a version of the application, adjusting the operation prompt to indicate no need to update the native application.

In other embodiments, the method further comprises: in response to determining that the second response from the local server is not received and there are one or more unselected ports, selecting a port from the one or more unselected ports and initiating, to the local server, an access request carrying an indication of the selected port. In yet other embodiments, the method further comprises: in response to determining that the second response from the local server is not received and all ports have been selected, rendering the web page based on the first response.

In still other embodiments, the first response comprises identifiers, and version information of multiple applications, and the method further comprises: determining whether the identifier of the native application in the second response is the same as one of the identifiers of the multiple applications in the first response.

In yet other embodiments, the method further comprises: in a first start-up process, the native application sending, to the local server, an instruction for binding with a port, the instruction carrying an indication of the port desired to be bound by the native application; the local server determining whether the port desired to be bound has been bound; and in response to determining that the port desired to be bound has not been bound, the local server binding the native application with the port.

In other embodiments, the method further comprises: in response to determining that the port desired to be bound has been bound with another application and there are one or more unbound ports, the local server selecting a port from the one or more unbound ports and binding the native application with the selected port.

In yet other embodiments, the method further comprises: in a first start-up process, the native application sending, to the local server, an instruction for binding with a port; and in response to determining that there are one or more unbound ports, the local server selecting a port from the one or more unbound ports and binding the native application with the selected port. In other embodiments, the method further comprises: in response to determining that all ports have been bound, the local server determining that binding fails.

In still other embodiments, the method further comprises: monitoring an installation status of a current application during an installation process of the current application; and upon detecting that the current application has been installed successfully, sending a binding instruction to the local server to bind the current application with a port.

In yet other embodiments, the method further comprises: determining whether there are one or more unbound ports; and in response to determining that there are one or more unbound ports, the local server selecting a port from the one or more unbound ports and binding the current application with the selected port.

According to another aspect, the embodiments of this application further provide a terminal. The terminal has a local server which provides a uniform resource locator (url) service to a native application installed on the terminal via a port bound with the native application. The terminal comprises: one or more processors and one or more non-transitory computer-readable memories coupled to the one or more processors and configured with instructions executable by the one or more processors to cause the terminal to perform operations comprising: receiving a first response from a web server in response to a web page access request initiated via the apparatus, wherein the first response comprises an identifier and version information of an application; selecting a port and initiating, to a local server on the apparatus, an access request carrying an identification of the selected port; determining whether a second response carrying an identifier and version information of a native application bound with the selected port on the terminal is received from the local server; in response to determining that the second response is received, determining whether the identifier of the native application and the identifier of the application in the first response are the same; and in response to determining that the identifiers are the same, adjusting an operation prompt according to the version information of the native application and the version information of the application in the first response.

According to still another aspect, the embodiments of this application further provide a non-transitory computer-readable storage medium storing instructions executable by one or more processors to perform operations comprising: receiving a first response from a web server in response to a web page access request initiated via the apparatus, wherein the first response comprises an identifier and version information of an application; selecting a port and initiating, to a local server on the apparatus, an access request carrying an identification of the selected port; determining whether a second response carrying an identifier and version information of a native application bound with the selected port on the terminal is received from the local server; in response to determining that the second response is received, determining whether the identifier of the native application and the identifier of the application in the first response are the same; and in response to determining that the identifiers are the same, adjusting an operation prompt according to the version information of the native application and the version information of the application in the first response.

In the embodiments of this application, a native application enables, on a local server in advance, a url service bound with a port. When a first response that is returned by a web server in response to a web page access request initiated by a user is received and the first response includes an identifier and version information of an application, a browser client can select a port from a registered port set and send, to the local server on a local terminal, an access request carrying an identification of the port, e.g., a port number, to obtain data of a native application. If the port number carried by the access request belongs to a port already bound with a native application, the browser client can obtain a name and version information of the native application, thereby realizing communication between the web page and the native application. Therefore, the browser client can adjust, in a personalized manner, operation prompts of various applications on a web page requested by a user, thereby improving user experience. Moreover, the embodiments of this application do not require url schema registration and can realize communication between a web page and a native application without network support, thereby further improving the user experience.

BRIEF DESCRIPTION OF THE DRAWINGS

The accompanying drawings illustrated herein are used to provide further understanding of embodiments of this application and constitute a part of the embodiments of this application, but do not limit the embodiments of this application. In the accompanying drawings.

DETAILED DESCRIPTION OF THE INVENTION

To make the objectives, technical solutions, and advantages of the embodiments of this application clearer, the embodiments of this application are further described in detail in the following with reference to the embodiments and the accompanying drawings. Examples and descriptions thereof in the embodiments of this application are merely used for illustrating the embodiments of this application, and are not intended to limit the embodiments of this application.

Implementations of the embodiments of this application are described in further detail in the following with reference to the accompanying drawings.

Figure 1:
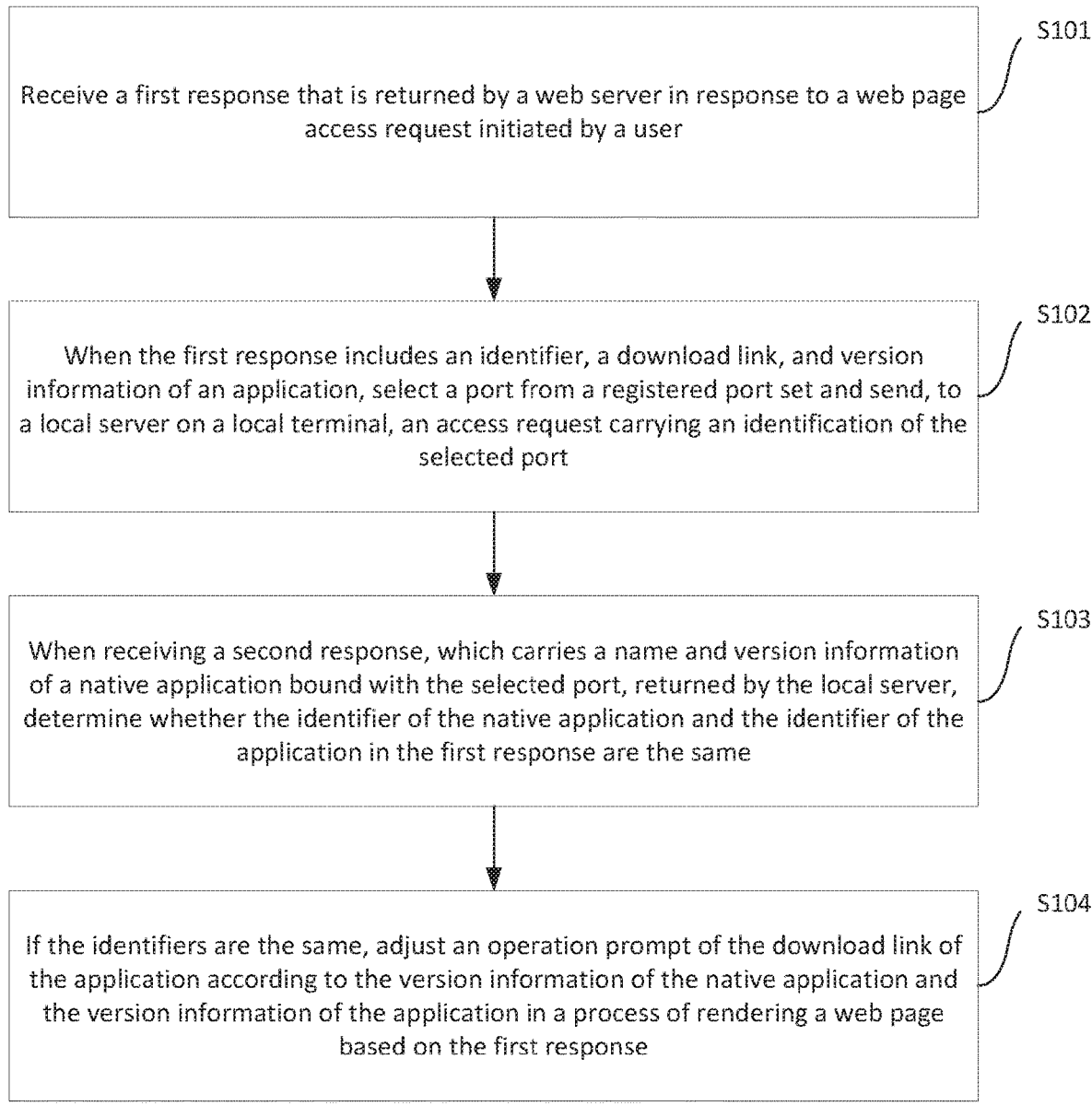
FIG. 1 is a flowchart of a method for realizing communication between a web page and a native application according to some embodiments of this application.

Referring to FIG. 1, a method for enabling a url service by a native application according to some embodiments of this application includes the following steps:

Step S101: Receive a first response that is returned by a web server in response to a web page access request initiated by a user.

Step S102: When the first response includes a name, a download link, and version information of an application, select a port from a registered port set and send, to a local server on a local terminal, an access request carrying an identification of the selected port.

In the embodiments of this specification, if a requested web page provides download for an application, a first response returned by a web server generally includes a name, a download link, and version information of the application. The download link may be a virtual button with an operation prompt, and the operation prompt may be, for example, "download."

In some embodiments, port numbers of logical ports of a server fall in a value range of 0 to 65535 according to the TCP/IP protocol. The ports can be further classified into well-known ports (port numbers of the well-known ports fall in a value range of 0 to 1023), dynamical ports (port numbers of the dynamical ports fall in a value range of 49152 to 65535), and registered ports (port numbers of the registered ports fall in a value range of 1024 to 49151). Generally, a registered port can be fixedly allocated to a particular service. Therefore, in some embodiments, during a port selection, a browser client can select a registered port from a registered port set according to an order of the port numbers of the registered ports or randomly. The registered port set is a set of the registered ports having the port numbers in, e.g., a range of 1024 to 49151. The selected port number may be a port number of an unbounded port or a port number of a port that has been bound already.

In some embodiments, the binding means that a native application enables, on a local terminal, a url service bound with a port. The native application refers to an application already installed on the terminal.

In one embodiment, the enabling, on a terminal, a url service bound with a port may be implemented in the following manner: at any time (the time may be appointed in advance) in a first start-up process, the native application sends, to a local server on the terminal, an instruction requesting binding with a registered port; if there are still unbound ports in the registered port set, the local server selects a port from the unbound ports and enables, for the native application, a url service bound with the port; or if all ports in the registered port set have been bound, the local server confirms that the current binding fails.

In another embodiment, the enabling, on a terminal, a url service bound with a port may also be implemented in the following manner: at any time (the time may be appointed in advance) in a first start-up process, the native application sends, to the local server, an instruction requesting binding with a registered port, where the instruction carries a port number of the port desired to be bound, and the port desired to be bound is pre-designated in the application by developers of the application; if the port desired to be bound is not bound yet, the local server enables, for the native application, a url service bound with the port; if the port desired to be bound has been bound and there are still unbound ports in the registered port set, the local server selects a port from the unbound ports and enables, for the native application, a url service bound with the selected port; or if all ports in the set of registered ports have been bound, the local server confirms that the current binding fails.

In a further embodiment, the enabling, on a terminal, a url service bound with a port may further be implemented in the following manner: a system monitors an installation status of a current application during an installation process of the current application; upon detection of an event that the current application has been installed successfully, the system is triggered to send a binding instruction to the local server to enable, for the current application, a url service bound with a port; if there are still unbound ports in the registered port set, the local server selects a port from the unbound ports and enables, for the current application, a url service bound with the selected port; or if all ports in the registered port set have been bound, the local server confirms that the current binding fails.

In any one of the foregoing binding manners, after a url service bound with a port is enabled for the native application, the local server stores a correspondence table between native applications and corresponding bound ports (as shown in Table 1 below):

TABLE 1

| | Application name | | | | |
|---|---|---|---|---|---|
| | Application 1 | Application 2 | Application 3 | Application 4 | Application 5 |
| Bound port | 7683 | 1029 | 6542 | 4712 | 4623 |
| Version information | 1.15.110.1221 | 2.16.111.1222 | 3.17.112.1223 | 4.18.113.1224 | 5.19.114.1225 |

This table further records version information corresponding to the native applications. If some native applications are updated after binding, the local server correspondingly updates the version information in the table. The name of an updated native application remains unchanged (for example, Alipay is still named Alipay after update). Therefore, if a native application is updated, it may be unnecessary to bind a new port to the native application.

In addition, in any one of the foregoing binding manners, if a native application on the terminal is uninstalled, the system will monitor an uninstallation status of the native application during the uninstallation process.

Upon detection of an event that a native application bound with a port has been uninstalled successfully, the system is triggered to send, to the local server, an unbinding instruction for unbinding the port bound with the native application, to release the occupied port resource. After receiving the unbinding instruction, the local server unbinds the corresponding port from the application and updates the foregoing correspondence table. Updating the foregoing correspondence table may be deleting the whole data set corresponding to the name of the uninstalled application from the correspondence table, or deleting all data in the data set corresponding to the name of the uninstalled application from the correspondence table except for the name.

Step S103: When receiving a second response, which carries a name and version information of a native application bound with the selected port in Step S102, returned by the local server, determine whether the native application in the second response and the application in the first response are the same. Here, the application in the response means that the application is referenced by the response, for example, the identifier being carried by the response, but does not necessarily mean that the whole application is included in the response. The determining can be done by comparing the identifier of the native application in the second response and the identifier of the application in the first response.

Step S104: If the native application in the second response and the application in the first response are the same, adjust an operation prompt of the download link of the application according to the version information of the native application and the version information of the application in a process of rendering a web page based on the first response.

In some embodiments, the applications being the same means that the applications have the same name. For example, if a native application on the local terminal is Alipay, an application in the first response which is the same as the native application is also Alipay.

In some other embodiments, the access request that carries a registered port and that is initiated to the local server on the terminal may be, for example, in the following form: http://local terminal IP+registered port number.

In some embodiments, an application name is used as an application identifier; in other embodiments, a character string or the like may be used as an application identifier.

Embodiments of this application may be executed by a browser client, or by other modules or applications having similar functions.

In some embodiments, a native application enables, on a local server in advance, a url service bound with a port. When a first response that is returned by a web server in response to a web page access request initiated by a user is received and the first response includes an identifier, a download link, and version information of an application, a browser client can select a port from a registered port set and send, to the local server on a terminal, an access request carrying the selected port number, to obtain data of a native application. If the port number carried by the access request belongs to a port already bound with the native application, the browser client can obtain a name and version information of the native application, thereby realizing communication between the web page and the native application. Therefore, the browser client can adjust, in a personalized manner, operation prompts of download links of various applications on a web page requested by a user, thereby improving user experience. Moreover, embodiments of this application does not require url schema registration and can realize communication between a web page and a native application without network support, thereby further improving the user experience.

Figure 2:
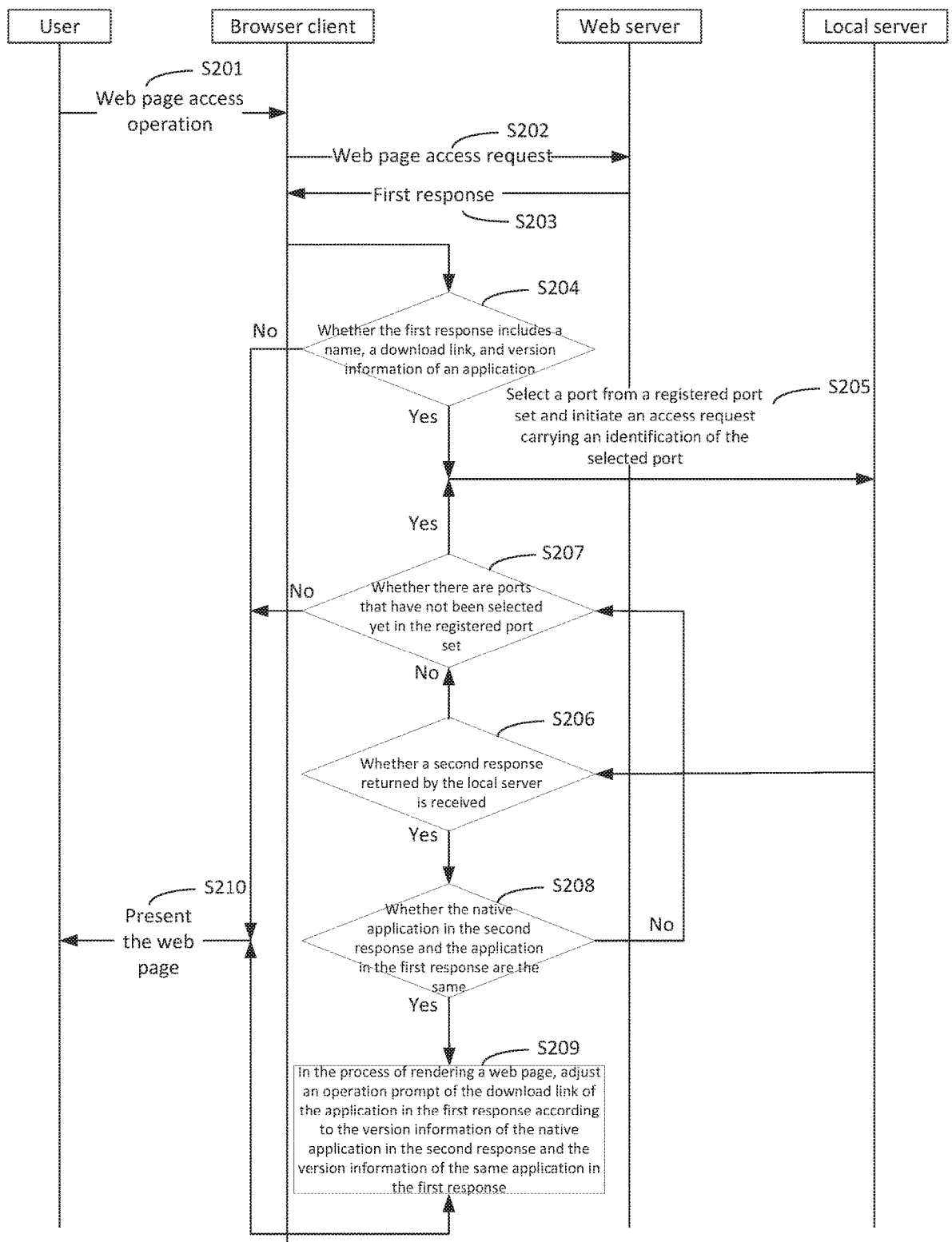
FIG. 2 is a flowchart of a method for realizing communication between a web page and a native application according to other embodiments of this application.

Referring to FIG. 2, a method for realizing communication between a web page and a native application according to some other embodiments of this application includes the following steps:

Step S201: A user initiates a web page access operation to a browser client. The web page may be any web page that the user wants to open. The access operation may include entering a url address in an address bar of the browser client, clicking a web page link, or the like, by the user.

Step S202: The browser client initiates a web page access request to a web server based on the web page access operation of the user.

Step S203: After generating a first response based on the web page access request, the web server returns the first response to the browser client.

Step S204: After receiving the first response returned by the web server, the browser client parses the first response to determine whether the first response includes a name, a download link, and version information of an application. If yes, the method proceeds to step S205; otherwise, the method proceeds to step S210.

In some embodiments, if a requested web page provides an application for download, the first response returned by the web server generally includes a name, a download link, and version information of the application.

In some embodiments, the download link may be a virtual button with an operation prompt, and the operation prompt may be, for example, "download."

Step S205: The browser client selects a port from a registered port set and initiates, to a local server on a terminal, an access request carrying an identification of the selected port.

Port numbers of logical ports of a server fall in a value range of 0 to 65535 according to the TCP/IP protocol. The ports can be further classified into well-known ports (port numbers of the well-known ports fall in a value range of 0 to 1023), dynamical ports (port numbers of the dynamical ports fall in a value range of 49152 to 65535), and registered ports (port numbers of the registered ports fall in a value range of 1024 to 49151). Generally, only a registered port can be fixedly allocated to a particular service. Therefore, in some embodiments of this application, during a port selection, the browser client can select a port from a registered port set (that is, a set of registered ports having the port numbers in a range of 1024 to 49151) according to an order of the port numbers or randomly. The selected port may be an unbounded port or a port that has been bound already.

In an example, if an IP address of the local terminal is 127.0.0.1 and the port number of the port currently selected by the browser client is 7777, an access request that carries the port number and that is initiated by the browser client to the local server on the local terminal in a "get" or "post" manner may be http://127.0.0.01:7777.

Step S206: After initiating the access request carrying the port number, the browser client determines whether a second response returned by the local server is received; if the second response returned by the local server is received, the method proceeds to step S208; otherwise, the method proceeds to step S207. The second response is a response that is returned by the local server in response to the access request carrying the port number, and the response includes a name and version information of a native application bound with the port having the port number.

In some embodiments of this application, after receiving the access request carrying the port number sent by the browser client, the local server searches a pre-stored correspondence table between native applications and corresponding bound ports (as shown in Table 1 above) according to the port number carried in the request to determine whether there is a native application bound with the port having the port number. If there is a native application bound with the port, a name and version information of the native application corresponding to the port number are read from the correspondence table, and a second response including the name and the version information is returned to the browser client. If there is no native application bound with the port, prompt information is returned to the browser client indicating a request failure.

Step S207: When the browser client does not receive the second response returned by the local server, it is indicated that the local server does not have a native application bound with the port, and the browser client determines whether there are ports that have not been selected yet in the registered port set; if yes, the method proceeds to step S205 to make an access attempt again; otherwise, the method proceeds to step S210.

Step S208: When receiving the second response returned by the local server, the browser client can obtain the name and version information of the native application in the second response by parsing the second response. Then, the name of the native application is compared with the name of the application in the previously obtained first response to determine whether the native application in the second response and the application in the first response are the same. If the name of the native application in the second response is the same as the name of the application in the first response, it is determined that the native application in the second response and the application in the first response are the same, and then the method proceeds to step S209; otherwise, the method proceeds to step S207.

In some embodiments, if a requested web page includes multiple promoted applications, the first response returned by the web server includes a name, a download link and version information of each of the multiple applications. Then, during comparison of the applications' names in step S208, the name of the native application in the second response is compared with the name of each of the multiple applications in the first response. If after the comparison it is found that the native application in the second response is the same as any of the multiple applications in the first response, the method proceeds to step S209; if after the comparison it is found that none of the applications in the first response is the same as the native application in the second response, the method proceeds to step S207.

Step S209: In the process of rendering a web page based on the first response, adjust an operation prompt of the download link of the application in the first response according to the version information of the native application in the second response and the version information of the same application in the first response.

In some embodiments of this application, the adjusting an operation prompt of the download link of the application may include: when a version of the native application in the second response is lower than a version of the same application in the first response, adjusting the operation prompt of the download link of the same application in the first response from "download" to "update;" or when a version of the native application in the second response is not lower than a version of the same application in the first response, adjusting the operation prompt of the download link of the same application in the first response from "download" to "installed."

Step S210: Present the web page for the user to view.

Figure 3:
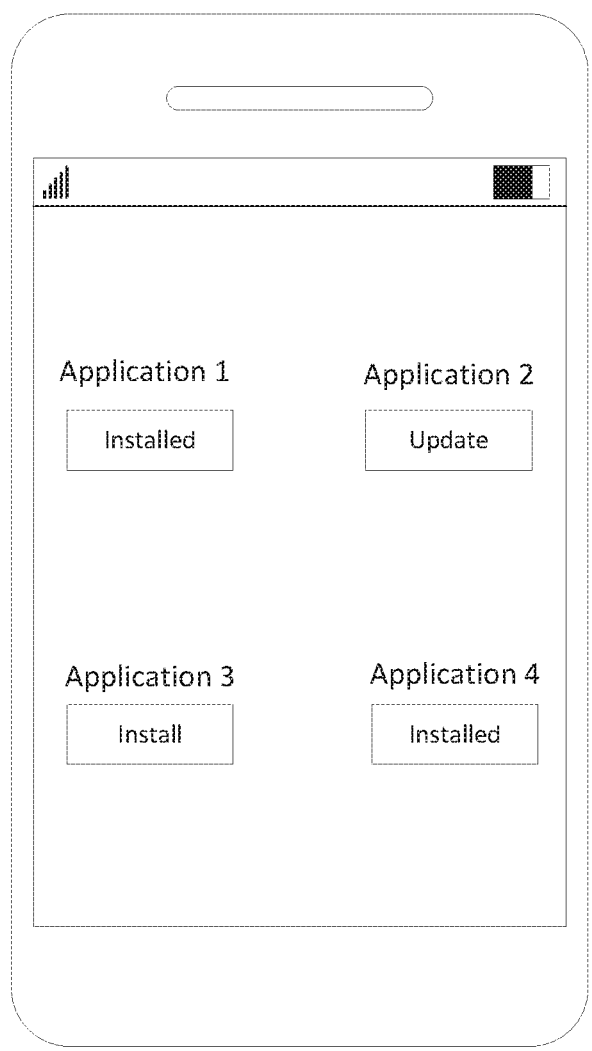
FIG. 3 is a schematic diagram of a presented web page according to some embodiments of this application (where only an application part on the web page is drawn)

In some embodiments, if a requested web page includes multiple promoted applications, a web page finally presented on the user terminal is shown in FIG. 3 after processing according to embodiments of this application. It can be seen from FIG. 3 that in the embodiments of this application, operation prompts of download links of applications on a web page requested by a user can be adjusted in a personalized manner according to an actual application installation status of the user terminal, so that the user can accurately know which applications have been already installed, which applications have not been installed yet, and which applications can be updated among the applications on the requested web page.

In some embodiments, an application name is used as an application identifier; in other embodiments, a character string or the like may be used as an application identifier.

In some embodiments of this application, a native application enables, on a local server, a url service bound with a port. When a first response that is returned by a web server in response to a web page access request initiated by a user is received and the first response includes an identifier, a download link, and version information of an application, a browser client can select a port from a registered port set and send, to the local server on a local terminal, an access request carrying a port number of the selected port, to obtain data of a native application. If the port number carried by the access request belongs to a port already bound with the native application, the browser client can obtain a name and version information of the native application, thereby realizing communication between the web page and the native application. Therefore, the browser client can adjust, in a personalized manner, operation prompts of download links of various applications on a web page requested by a user, thereby improving user experience. Moreover, embodiments of this application does not require url schema registration and can realize communication between a web page and a native application without network support, thereby further improving the user experience.

Although the processes described above include multiple operations that appear in a particular sequence, these processes may include more or fewer operations which can be performed in sequence or in a parallel manner (for example, by using a parallel processor or in a multithread environment).

Figure 4:
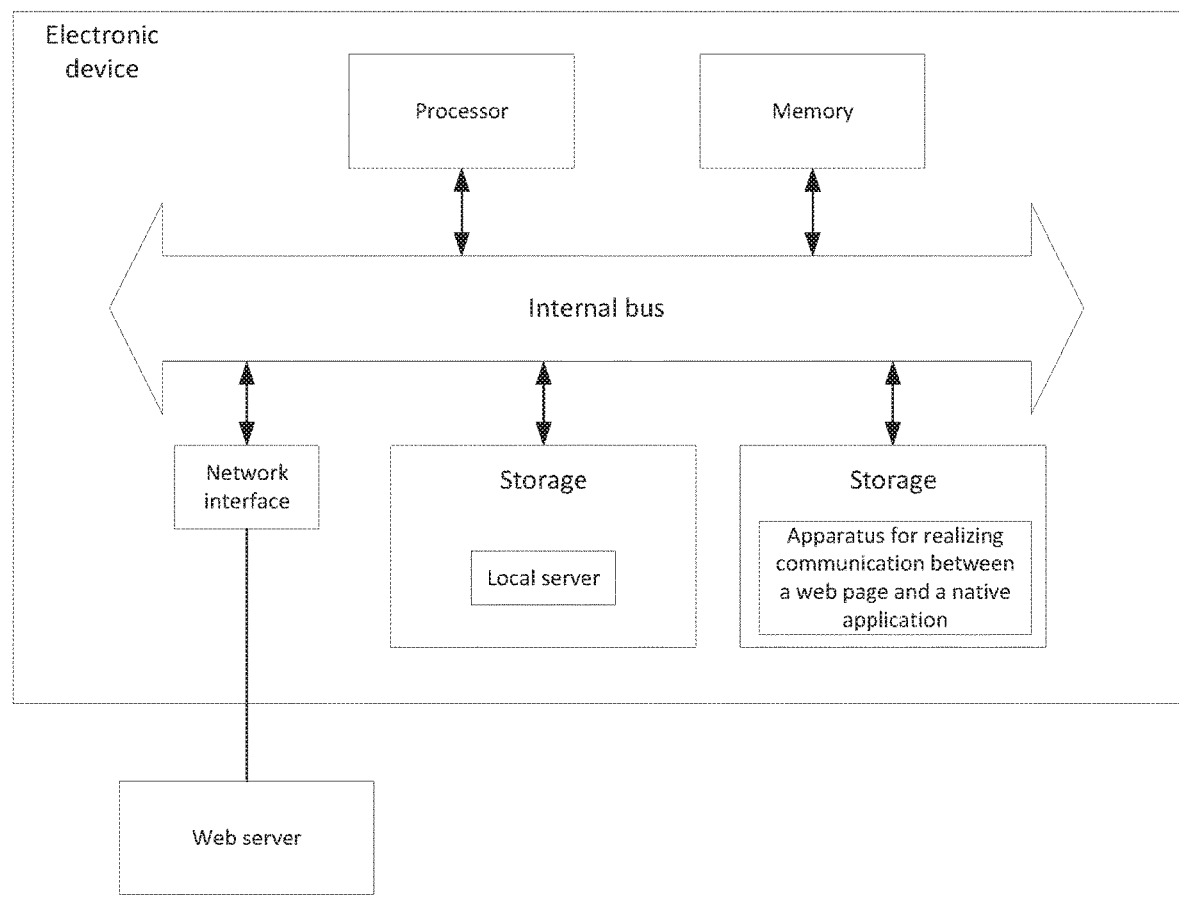
FIG. 4 is a structural block diagram of an electronic device according to some embodiments of this application.

Referring to FIG. 4, FIG. 4 is a structural block diagram of an electronic device according to some embodiments of this application. On a hardware level, the electronic device includes a processor, an internal bus, a network interface, memory, and storage, and may include other hardware required by services. The processor reads a corresponding computer program from the storage to the memory and then runs the computer program to form, on a logical level, an apparatus for realizing communication between a web page and a native application.

A logical structure of an apparatus for realizing communication between a web page and a native application according to embodiments of this application is described in the following with reference to FIG. 5. In the embodiments of this application, the native application enables in advance, on a local server on a terminal, a uniform resource locator (url) service bound with a port.

Figure 5:
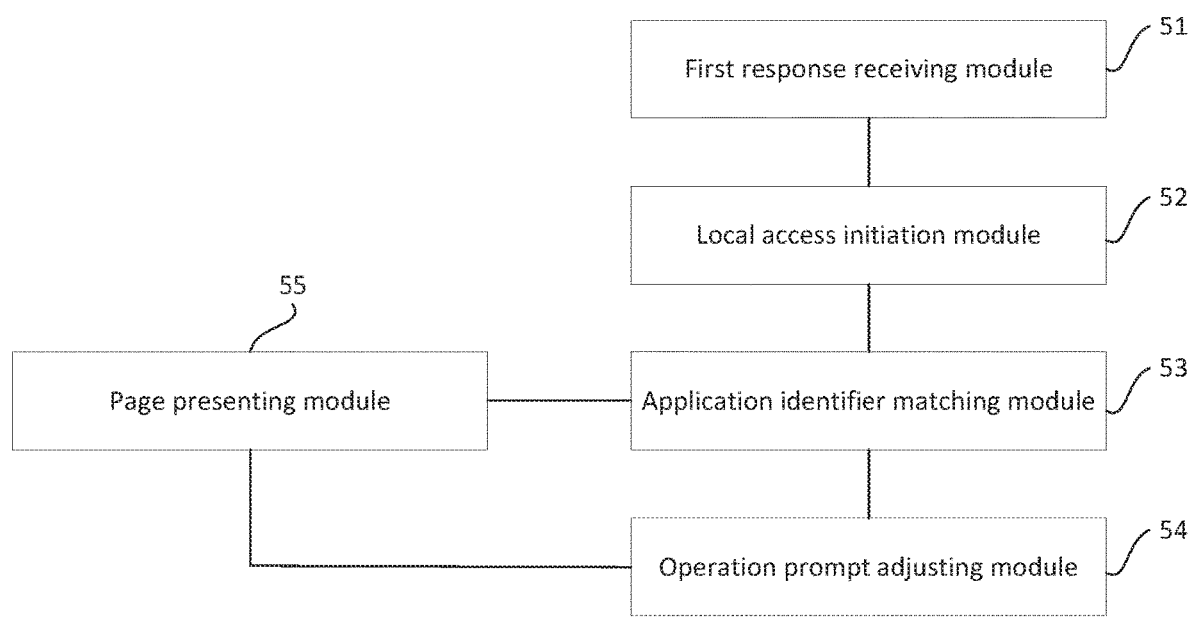
FIG. 5 is a structural block diagram of an apparatus for realizing communication between a web page and a native application according to some embodiments of this application.

Referring to FIG. 5, the apparatus for realizing communication between a web page and a native application according to some embodiments of this application includes: a first response receiving module 51, configured to receive a first response that is returned by a web server in response to a web page access request initiated by a user; a local access initiation module 52, configured to: when the first response includes an identifier, a download link and version information of an application, select a port from a registered port set and initiate, to the local server located on the terminal, an access request carrying a port number of the selected port; an application identifier matching module 53, configured to: when receiving a second response returned by the local server, determine whether a native application in the second response and the application in the first response are the same, where the second response carries an identifier and version information of the native application; an operation prompt adjusting module 54, configured to: when the native application and the application are the same, adjust an operation prompt of the download link of the application according to the version information of the native application and the version information of the application in a process of rendering a web page based on the first response; and a page presenting module 55, configured to present the web page for the user to view.

That the operation prompt adjusting module 54 adjusts an operation prompt of the download link of the application according to the version information of the native application and the version information of the application includes: when a version of the native application is lower than a version of the application, adjusting the operation prompt of the download link of the application to be "update;" or when a version of the native application is not lower than a version of the application, adjusting the operation prompt of the download link of the application to be "installed."

The apparatus for realizing communication between a web page and a native application in the embodiments of this application corresponds to the method for realizing communication between a web page and a native application in the foregoing embodiments. Therefore, for content of the apparatus for realizing communication between a web page and a native application in the embodiments of this application, the method for realizing communication between a web page and a native application in the foregoing embodiments can be referenced. Details are not described herein again.

In some embodiments of this application, a native application enables, on a local server in advance, a url service bound with a port. Then, when a first response that is returned by a web server in response to a web page access request initiated by a user is received and the first response includes an identifier, a download link, and version information of an application, a browser client can select a port from a registered port set and send, to the local server on a local terminal, an access request carrying a port number of the selected port, to obtain data of a native application. If the port number carried by the access request belongs to a port already bound with the native application, the browser client can obtain a name and version information of the native application, thereby realizing communication between the web page and the native application. Therefore, the browser client can adjust, in a personalized manner, operation prompts of download links of various applications on a web page requested by a user, thereby improving user experience.

A person skilled in the art can also understand that various illustrative logical blocks, units and steps listed in the embodiments of this application can be implemented by hardware, software or a combination thereof. Whether the logical blocks, units and steps are implemented by hardware or software depends on specific applications and overall system design requirements. A person skilled in the art can use various methods to implement functions for each particular application. However, such implementations should not be considered as exceeding the protection scope of the embodiments of this application.

The various illustrative logical blocks or units described in the embodiments of this application may be implemented by a general purpose processor, a digital signal processor, an application specific integrated circuit (ASIC), a field programmable gate array or other programmable logic devices, discrete gate or transistor logic, discrete hardware components, or any combination thereof designed to perform the described functions. The general purpose processor may be a microprocessor. Optionally, the general purpose processor may be any conventional processor, controller, microcontroller, or state machine. The processor may also be implemented through a combination of computing devices, for example, a combination of a digital signal processor and a microprocessor, multiple microprocessors, one or more microprocessors in conjunction with a digital signal processor core, or any other such configuration.

The steps of the method or algorithm described in the embodiments of this application may be directly embedded in hardware, in a software module executed by a processor, or in a combination thereof. The software module may be stored in a random access memory (RAM), a flash memory, a read-only memory (ROM), an electrically programmable ROM (EPROM), an electrically erasable programmable ROM (EEPROM), a register, a hard disk, a removable disk, a compact disc ROM (CD-ROM), or any other form of storage medium. For example, the storage medium may be connected to the processor such that the processor can read information from the storage medium and write information to the storage medium. Optionally, the storage medium may be integrated in the processor. The processor and the storage medium may be disposed in the ASIC, and the ASIC may be disposed in a user terminal. Optionally, the processor and the storage medium may be disposed in different components of a user terminal.

In one or more examples of designs, the functions described in the embodiments of this application may be implemented in hardware, software, firmware, or a combination thereof. If implemented in software, the functions may be stored on or transmitted over as one or more instructions or code on a computer-readable medium. The computer-readable medium includes both a computer storage medium and a communication medium that facilitates transfer of a computer program from one place to another. The storage medium may be any available medium that can be accessed by a general-purpose or special-purpose computer. For example, such a computer readable medium may include, but is not limited to, a RAM, a ROM, an EEPROM, a CD-ROM or other optical disc storage, magnetic disk storage or magnetic storages, or any other medium that can be used to carry or store program code in the form of instructions or data structures and in other forms that can be accessed by a general-purpose or special-purpose computer or a general-purpose or special-purpose processor. In addition, any connection can be properly defined as a computer readable medium. For example, if the software is transmitted from a website, server, or other remote resources using a coaxial cable, fiber optic cable, twisted pair, digital subscriber line (DSL), or wireless manners such as infrared, radio, and microwave, the coaxial cable, fiber optic cable, twisted pair, digital subscriber line (DSL), or wireless manners such as infrared, radio, and microwave are also included in the defined computer readable medium. The disk and disc include compact disc, laser disc, optical disc, digital versatile disc (DVD), floppy disk and blu-ray disc, where the disk usually reproduces data magnetically, while the disc usually reproduces data optically with lasers. The combination above may also be included in the computer readable medium.

The embodiments described above illustrate the objectives, technical solutions and beneficial effects of this application in further detail. It should be appreciated that the foregoing descriptions are merely embodiments of this application, and are not intended to limit the protection scope of this application. Any modification, equivalent replacement and improvement made without departing from the spirit and principle of this application should fall within the protection scope of this application.

What is claimed is:

1. A communication method comprising:
receiving, by a terminal, a first response from a web server in response to a web page access request, wherein the first response comprises an identifier and version information of an application;
selecting a port and initiating, to a local server on the terminal, an access request carrying an identification of the selected port;
determining whether a second response carrying an identifier and version information of a native application bound with the selected port on the terminal is received from the local server;
in response to determining that the second response is received, determining whether the identifier of the native application and the identifier of the application in the first response are the same; and
in response to determining that the identifiers are the same, adjusting an operation prompt according to the version information of the native application and the version information of the application in the first response.

2. The method according to claim 1, wherein the adjusting an operation prompt according to the version information of the native application and the version information of the application in the first response comprises:
in response to determining that a version of the native application is lower than a version of the application in the first response, adjusting the operation prompt to be an indication to update the native application; or
in response to determining that a version of the native application is not lower than a version of the application, adjusting the operation prompt to indicate no need to update the native application.

3. The method according to claim 1, further comprising:
in response to determining that the second response from the local server is not received and there are one or more unselected ports, selecting a port from the one or more unselected ports and initiating, to the local server, an access request carrying an indication of the selected port.

4. The method according to claim 1, further comprising:
in response to determining that the second response from the local server is not received and all ports have been selected, rendering the web page based on the first response.

5. The method according to claim 1, wherein the first response comprises identifiers, and version information of multiple applications, and wherein the method further comprises:
determining whether the identifier of the native application in the second response is the same as one of the identifiers of the multiple applications in the first response.

6. The method according to claim 1, further comprising:
in a first start-up process, the native application sending, to the local server, an instruction for binding with a port, the instruction carrying an indication of the port desired to be bound by the native application;
the local server determining whether the port desired to be bound has been bound; and
in response to determining that the port desired to be bound has not been bound, the local server binding the native application with the port.

7. The method according to claim 6, further comprising:
in response to determining that the port desired to be bound has been bound with another application and there are one or more unbound ports, the local server selecting a port from the one or more unbound ports and binding the native application with the selected port.

8. The method according to claim 1, further comprising:
in a first start-up process, the native application sending, to the local server, an instruction for binding with a port; and
in response to determining that there are one or more unbound ports, the local server selecting a port from the one or more unbound ports and binding the native application with the selected port.

9. The method according to claim 8, further comprising:
in response to determining that all ports have been bound, the local server determining that binding fails.

10. The method according to claim 1, further comprising:
monitoring an installation status of a current application during an installation process of the current application; and
upon detecting that the current application has been installed successfully, sending a binding instruction to the local server to bind the current application with a port.

11. The method according to claim 10, further comprising:
determining whether there are one or more unbound ports; and
in response to determining that there are one or more unbound ports, the local server selecting a port from the one or more unbound ports and binding the current application with the selected port.

12. An apparatus comprises one or more processors and one or more non-transitory computer-readable memories coupled to the one or more processors and configured with instructions executable by the one or more processors to cause the apparatus to perform operations comprising:
receiving a first response from a web server in response to a web page access request initiated via the apparatus, wherein the first response comprises an identifier and version information of an application;
selecting a port and initiating, to a local server on the apparatus, an access request carrying an identification of the selected port;
determining whether a second response carrying an identifier and version information of a native application bound with the selected port on the terminal is received from the local server;
in response to determining that the second response is received, determining whether the identifier of the native application and the identifier of the application in the first response are the same; and
in response to determining that the identifiers are the same, adjusting an operation prompt according to the version information of the native application and the version information of the application in the first response.

13. The apparatus according to claim 12, wherein the adjusting an operation prompt according to the version information of the native application and the version information of the application in the first response comprises:

in response to determining that a version of the native application is lower than a version of the application in the first response, adjusting the operation prompt to be an indication to update the native application; or in response to determining that a version of the native application is not lower than a version of the application, adjusting the operation prompt to indicate no need to update the native application.

14. The apparatus according to claim 12, wherein the operations further comprise:

in response to determining that the second response from the local server is not received and there are one or more unselected ports, selecting a port from the one or more unselected ports and initiating, to the local server, an access request carrying an indication of the selected port.

15. The apparatus according to claim 12, wherein the operations further comprise:

in response to determining that the second response from the local server is not received and all ports have been selected, rendering the web page based on the first response.

16. The apparatus according to claim 12, wherein the first response comprises identifiers, and version information of multiple applications, and wherein the operations further comprises:

determining whether the identifier of the native application in the second response is the same as one of the identifiers of the multiple applications in the first response.

17. The apparatus according to claim 12, wherein the operations further comprises:

in a first start-up process, the native application sending, to the local server, an instruction for binding with a port, the instruction carrying an indication of the port desired to be bound by the native application;

the local server determining whether the port desired to be bound has been bound; and in response to determining that the port desired to be bound has not been bound, the local server binding the native application with the port.

18. The apparatus according to claim 17, wherein the operations further comprises:

in response to determining that the port desired to be bound has been bound with another application and there are one or more unbound ports, the local server selecting a port from the one or more unbound ports and binding the native application with the selected port.

19. The apparatus according to claim 12, wherein the operations further comprises:

in a first start-up process, the native application sending, to the local server, an instruction for binding with a port; and in response to determining that there are one or more unbound ports, the local server selecting a port from the one or more unbound ports and binding the native application with the selected port.

20. A non-transitory computer-readable storage medium storing instructions executable by one or more processors to perform operations comprising:

receiving a first response from a web server in response to a web page access request initiated via the apparatus, wherein the first response comprises an identifier and version information of an application;

selecting a port and initiating, to a local server on the apparatus, an access request carrying an identification of the selected port;

determining whether a second response carrying an identifier and version information of a native application bound with the selected port on the terminal is received from the local server;

in response to determining that the second response is received, determining whether the identifier of the native application and the identifier of the application in the first response are the same; and in response to determining that the identifiers are the same, adjusting an operation prompt according to the version information of the native application and the version information of the application in the first response.

* * * * *